Figure 6:
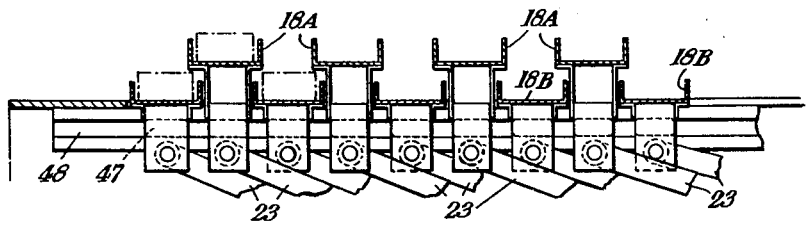

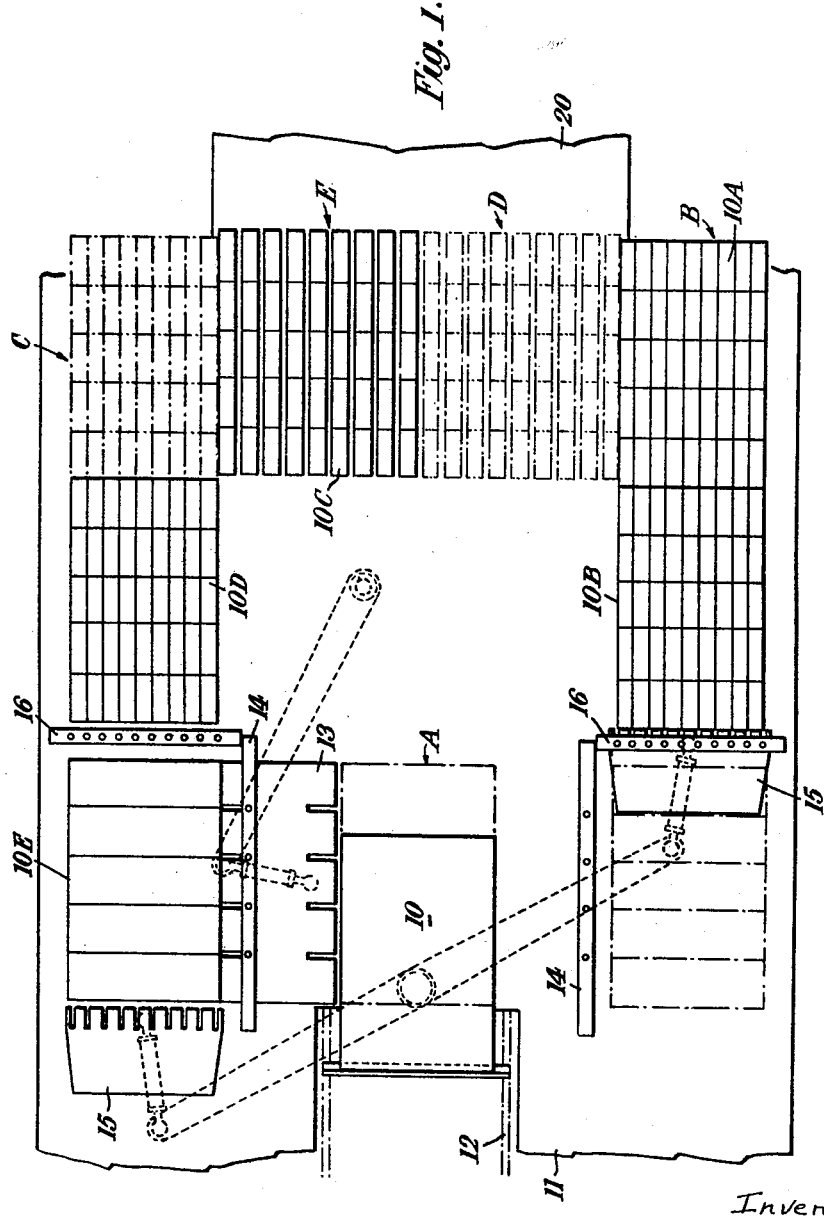

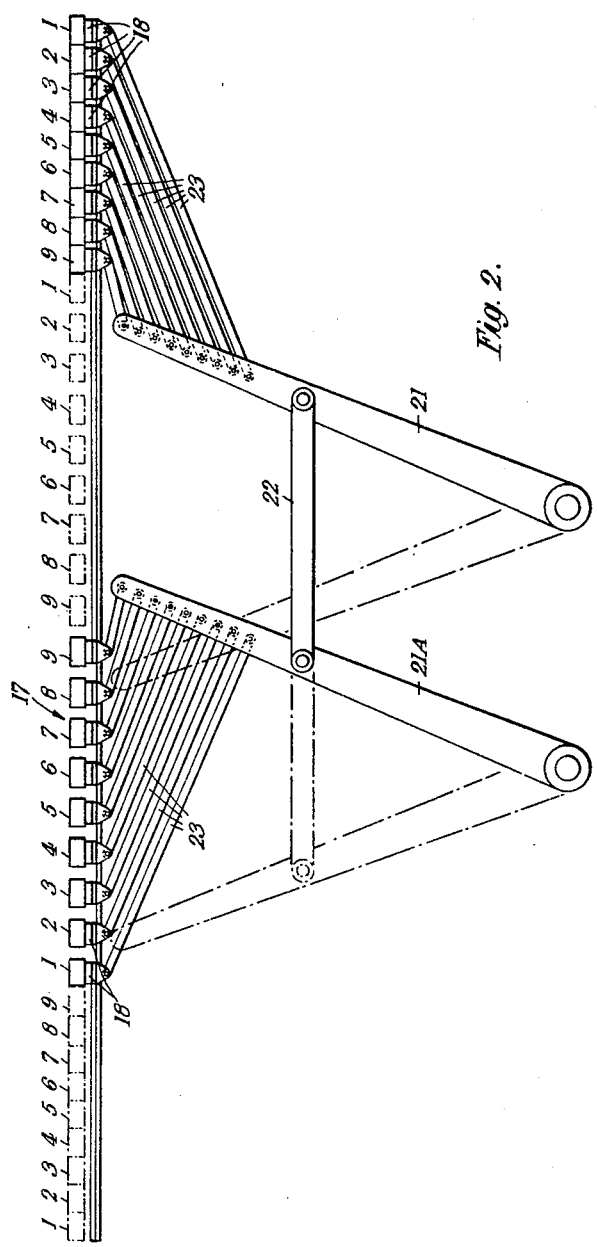
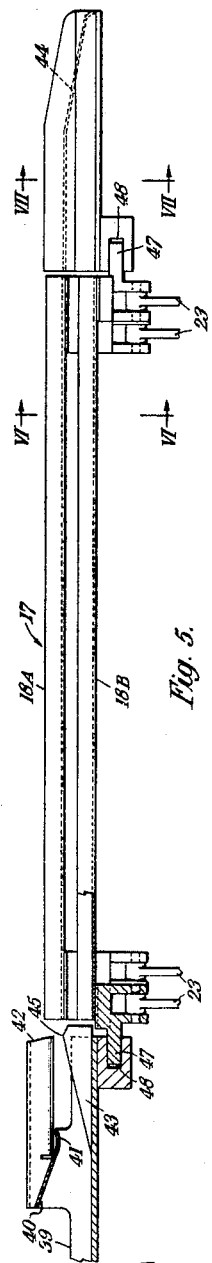

Oct. 18, 1960  F. DEWHURST ET AL  2,956,524
MANUFACTURE OF BISCUITS
Filed Nov. 25, 1957  9 Sheets-Sheet 3
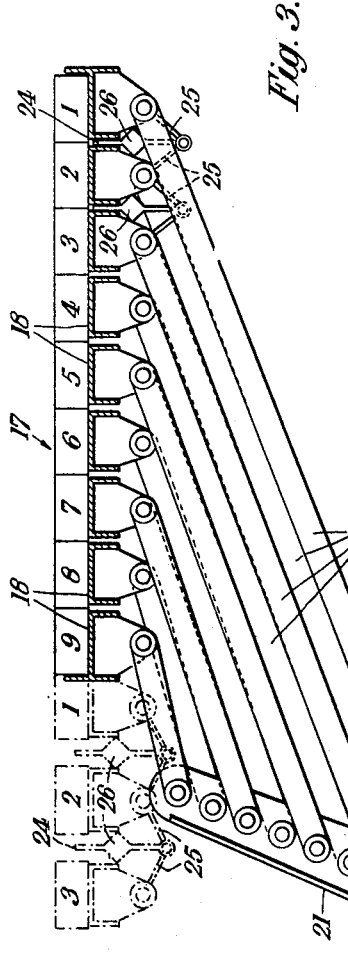
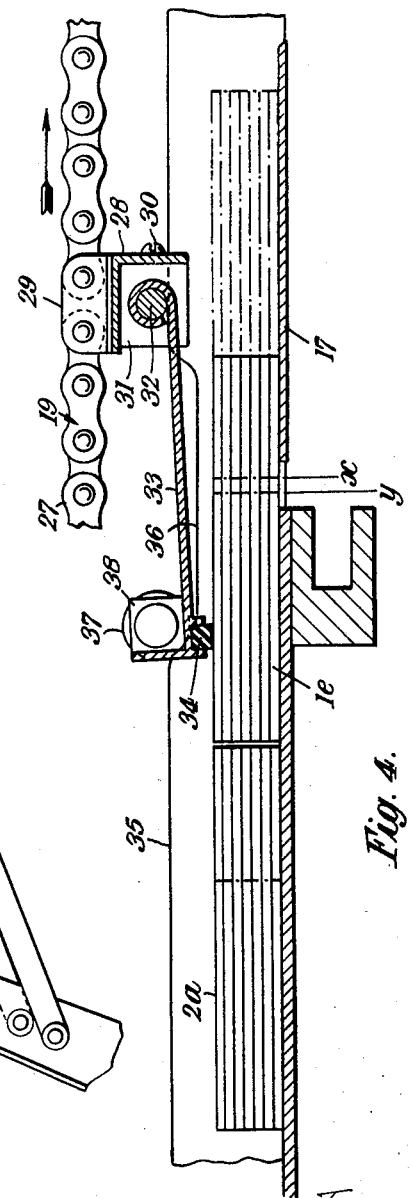
Inventors
Frank Dewhurst
Kenneth Farrer
By
Watson, Cole, Grindle & Watson
Attorneys Oct. 18, 1960     F. DEWHURST ET AL     2,956,524
MANUFACTURE OF BISCUITS Filed Nov. 25, 1957     9 Sheets-Sheet 5

Inventors
Frank Dewhurst
Kenneth Farrer

By
Watson, Cole, Grindle & Watson
Attorneys

Oct. 18, 1960   F. DEWHURST ET AL   2,956,524
MANUFACTURE OF BISCUITS

Filed Nov. 25, 1957   9 Sheets-Sheet 9

Inventors
Frank Dewhurst
Kenneth Farrer

By
Watson, Cole, Grindle & Watson
Attorneys

United States Patent Office 2,956,524
Patented Oct. 18, 1960

2,956,524

MANUFACTURE OF BISCUITS

Frank Dewhurst and Kenneth Farrer, Peterborough, England, assignors to Baker Perkins Limited, Peterborough, England, a company of Great Britain Filed Nov. 25, 1957, Ser. No. 698,575

13 Claims. (Cl. 107—69)

This invention relates to the manufacture of wafer sandwiches. Such sandwiches are manufactured in the form of wafer sandwich blocks which are subsequently cut both longitudinally and transversely into individual sandwiches. The rows of sandwiches extending longitudinally in the cut block are hereinafter referred to as files of sandwiches while the rows extending transversely in the cut block are hereinafter referred to as ranks of sandwiches. It is necessary after cutting to space the closely adjacent files of sandwiches in the blocks laterally preparatory to their passage to an enrober in which they are coated with chocolate or the like and/or to other processing equipment, for instance packing or wrapping machines.

The invention provides apparatus for use in the manufacture of wafer sandwiches comprising a wafer separating table consisting of a number of narrow parallel strips, mechanism for periodically moving the strips laterally from a receiving position, in which they are disposed close together, to a spaced position and back again, means for feeding cut sandwich blocks from a cutting unit onto the table while the strips are in the receiving position, each strip receiving a single file of sandwiches, and mechanism for removing the files of sandwiches endwise from the table while the strips are in the spaced position.

The individual strips constituting the table may for example be moved towards and away from one another by a system of levers operated in timed relationship with a pusher which feeds the sandwich blocks through the cutter.

The table may, moreover, be arranged to move bodily in a lateral direction as the strips move from the receiving to the separated position and vice versa. Also, as explained in more detail later, the strips may abut together in the receiving position, or alternatively narrow gaps may exist between the strips in the receiving position, these gaps accommodating retractable guides which are raised above the level of the strips as the latter move apart.

When the wafer sandwiches are filled with cream they separate easily and there is no difficulty in effecting lateral separation of the adjacent files of sandwiches by movement of the component strips of the wafer separating table from the receiving to the separated position. Wafer sandwiches filled with caramel tend, however, to stick together. The present invention accordingly provides for initial separation of the adjacent files of sandwiches as they pass from the cutter to the separating table.

According to a feature of the invention, therefore, alternate strips of the separating table are situated at different levels, being vertically staggered by an amount not less than the thickness of the sandwiches, and a system of guides is provided between the cutter and the table for conducting the files of wafer sandwiches to the associated strips of the table.

Preferably, alternate strips of the table are disposed at the same level as the base plate of the cutting unit while the remaining strips are disposed at a common higher level, the guide system including ramps up which alternate files of sandwiches are fed to the higher strips.

Figure 7:
Figure 8:
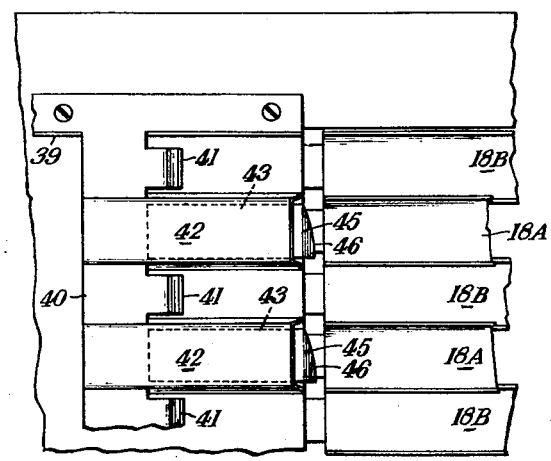

Certain specific embodiments of the invention will now be described in detail, by way of example, with reference to the accompanying drawings, in which:

Fig. 1 is a diagrammatic plan view of the cutting unit and the wafer separating table, Fig. 2 is a diagrammatic section through the wafer separating table showing one form of mechanism for actuating the strips thereof, Fig. 3 is a similar view showing an alternative arrangement including retractable guides between the strips of the separating table, Fig. 4 is a sectional elevation showing a mechanism for effecting longitudinal separation of the cut sandwich blocks prior to movement of the separating table, Fig. 5 is a side elevation, partly in section, of a wafer separating table in which alternate strips are situated at different levels, Figs. 6 and 7 are respectively sections on the lines VI—VI and VII—VII in Fig. 5, Fig. 8 is a plan view of the left hand end of the table shown in Fig. 5.

Figure 9:
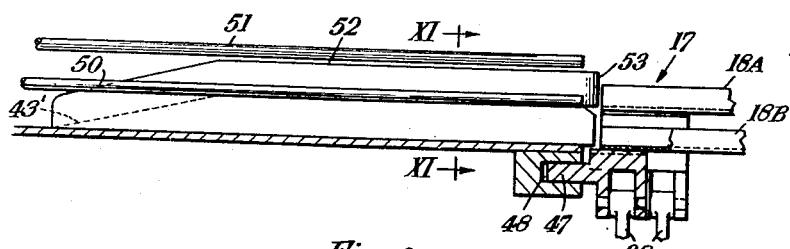
Figure 10:
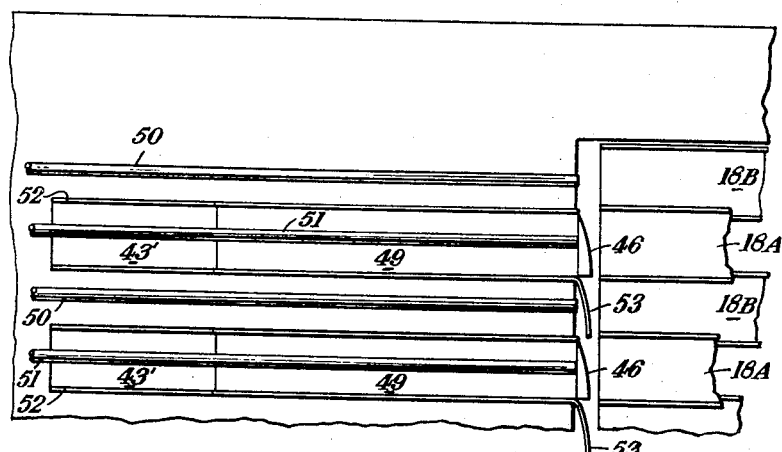
Figure 11:
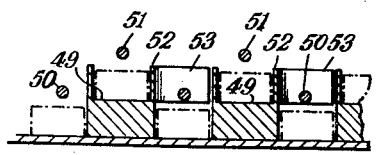
Figure 12:
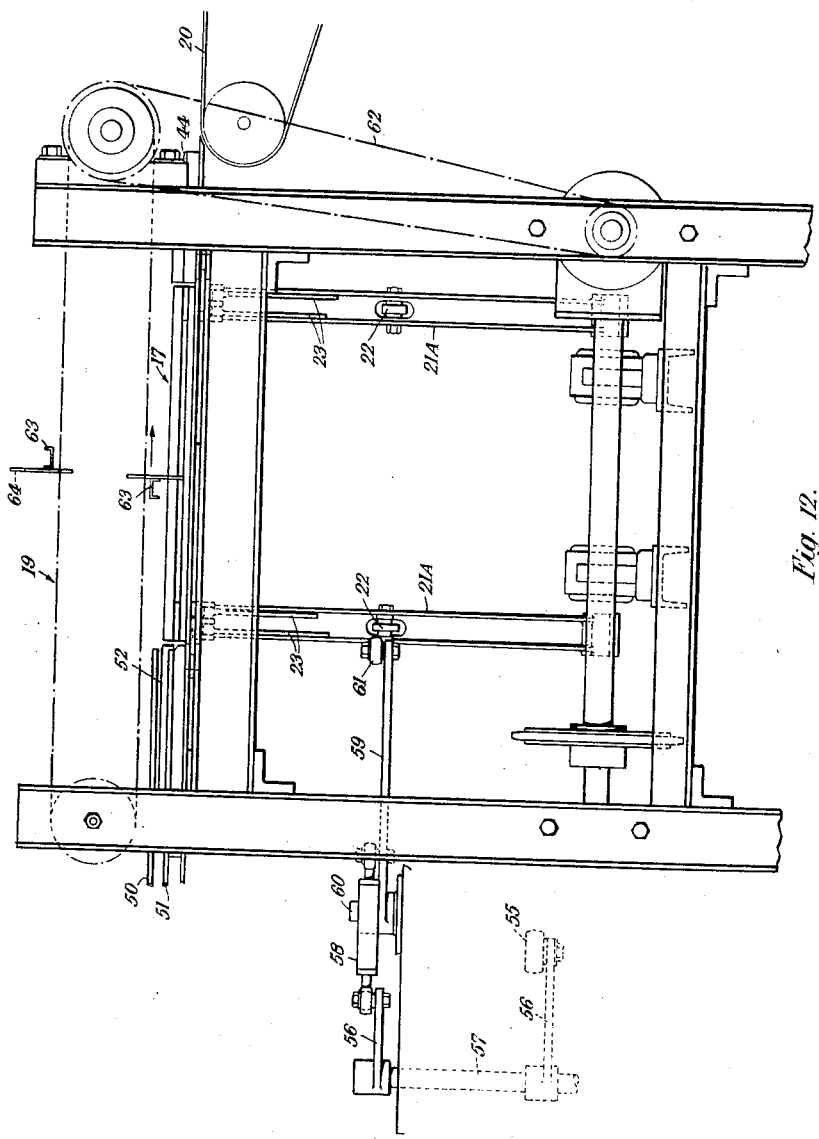
Figure 13:
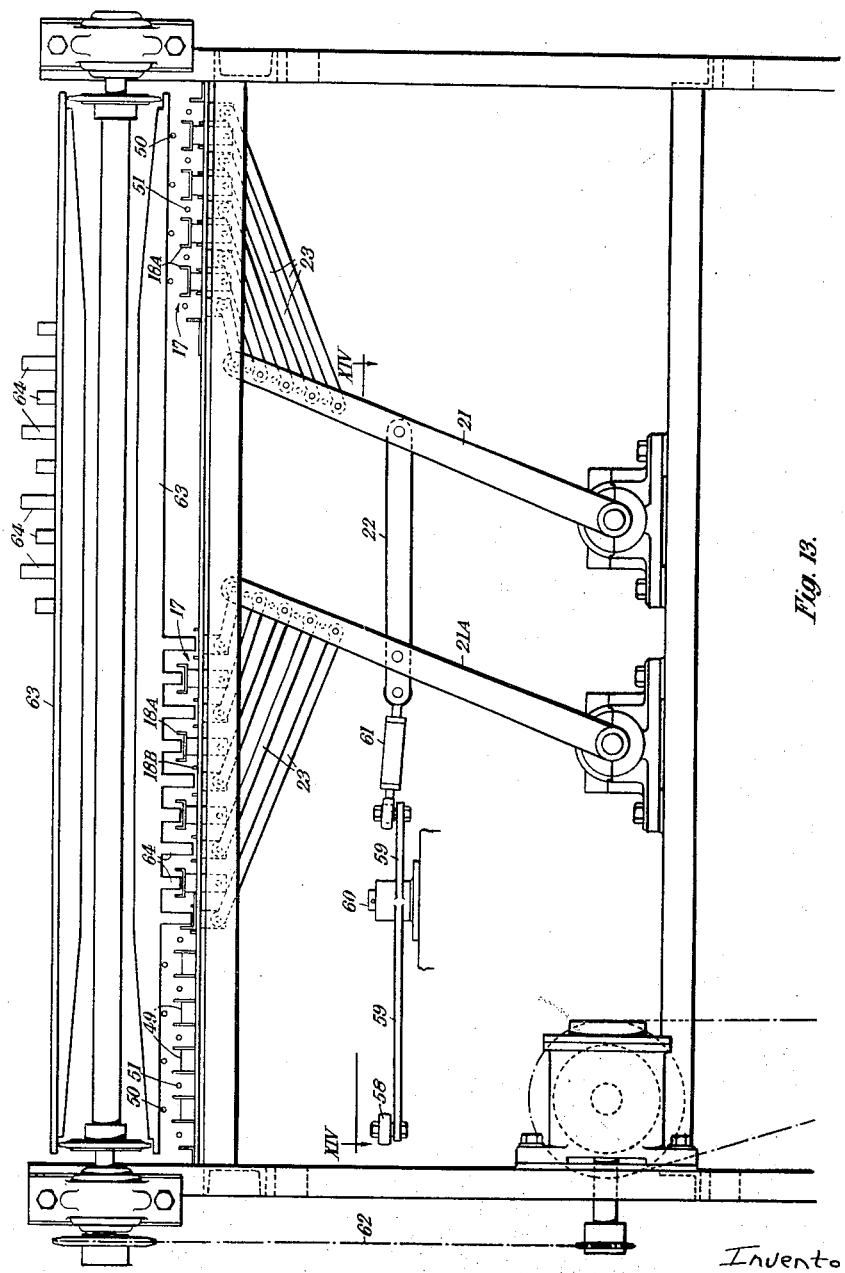
Figure 14:
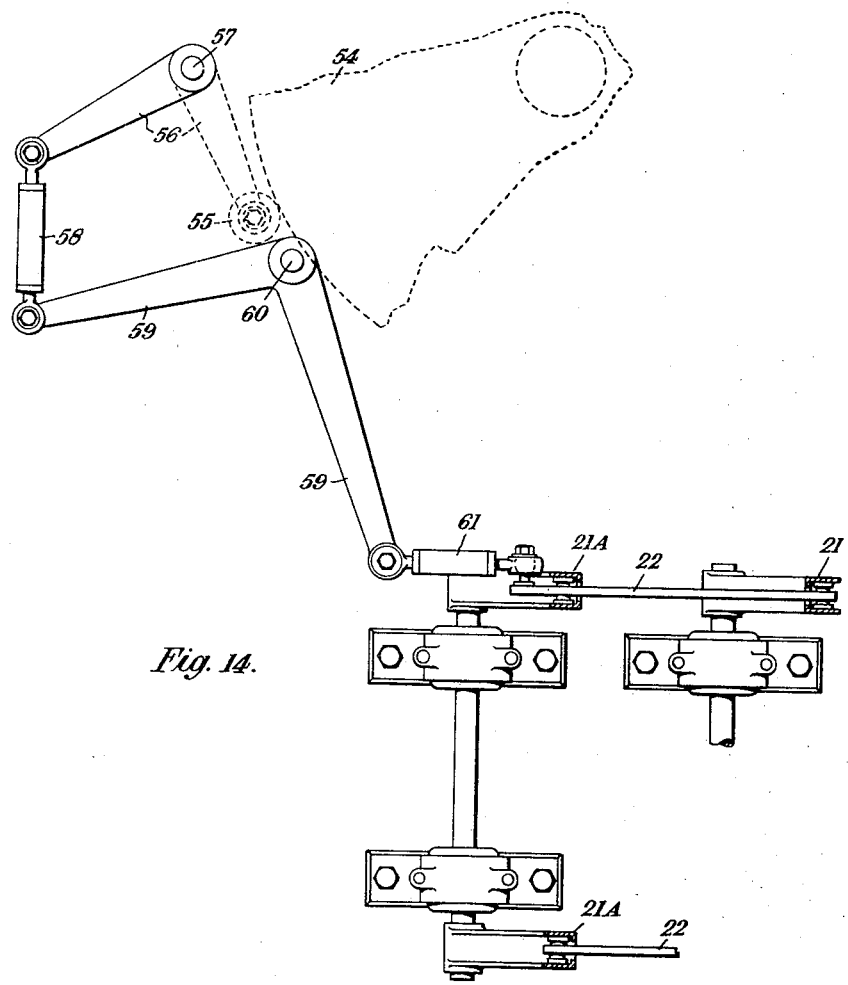
Figure 15:
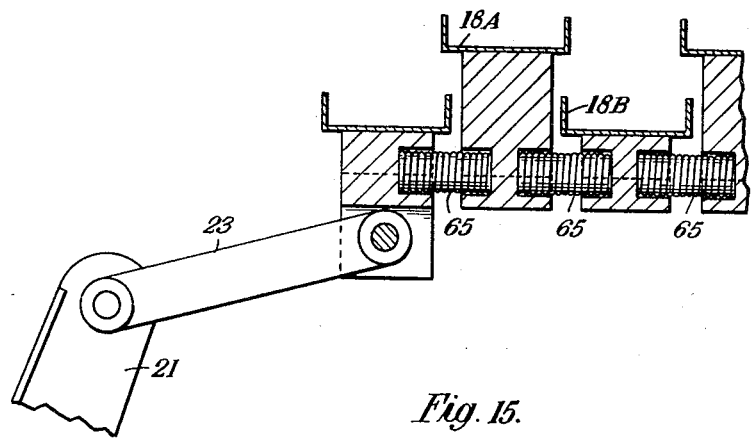
Figure 16:
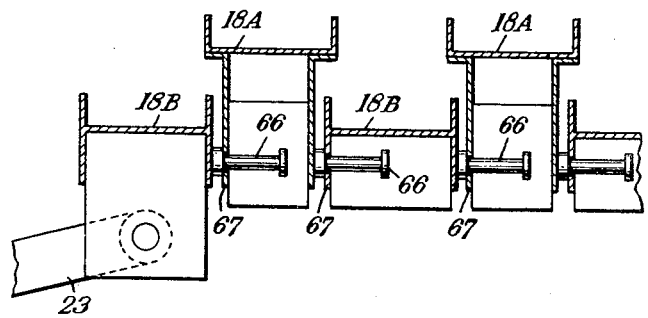

Fig. 9 is a side elevation, partly in section, of the left hand end of a separating table similar to that shown in Fig. 5 but with a different system of ramps, Fig. 10 is a corresponding plan view, Fig. 11 is a section on the line XI—XI in Fig. 9, Fig. 12 is a side elevation of a separating table as shown in Fig. 9, showing the overhead flight conveyor and the mechanism for moving the strips, Fig. 13 is a corresponding end elevation, with the delivery ramps omitted, Fig. 14 is a fragmentary section on the line XIV—XIV in Fig. 13 and Figs. 15 and 16 are sectional views on a larger scale showing alternative mechanisms for actuating the strips.

Like reference characters indicate like parts throughout the figures.

Referring first to Fig. 1, and as more fully described in U.S. application of K. Farrer, Serial No. 574,895, filed March 29, 1956, now Patent No. 2,917,009, dated December 15, 1959, wafer sandwich blocks 10 are fed in succession onto a stationary platform 11, constituting the base plate of a cutting unit, by a conveyor 12. When the blocks reach the position A they are moved alternately to right and left by a pusher 13 through cutters 14 which cut the blocks transversely. The blocks are then fed in two parallel coumns by alternately operating pushers 15 through cutters 16 which cut the blocks longitudinally. After passage through the cutters 16 the cut blocks in each column are pushed onto identical wafer separating tables 17, each consisting of a number of narrow strips 18, marked 1 to 9, in Fig. 2, which abut closely together and are each of a width equal to that of one file of sandwiches.

The cut blocks in the two columns are fed on to the separating table 17 at the positions B and C respectively, and after each table has received a cut block, with one file of sandwiches in the block accommodated on each of its strips 18, the table moves laterally and its strips at the same time move apart to effect lateral separation of the files of sandwiches. The table at position B moves to position D and the table at position C moves to position E.

Each cut block is pushed on to its separating table by the immediately succeeding cut block which has just left the cutter. Thus the cut block 10A which, in Fig. 1, is shown at position B has been moved there by the succeeding block 10B. The separated block 10C at position E was pushed shortly before on to the table at position C by the block 10D which, in turn, will later be pushed on to the table at position C by the succeeding block 10E when it is pushed through the cutter 16 by the pusher 15.

The tables 17 are moved alternately from their receiving position (B or C) to their separated position (D or E) in timed relation with the operation of the pushers 15. When the table at position B moves to position D to effect lateral separation of the files of sandwiches thereon the other table returns from the separated position E to the receiving position C and vice versa. The separated files of sandwiches are transferred alternately from positions D and E by an overhead flight conveyor, not shown in Fig. 1 but illustrated at 19 in Figs. 12 and 13, to a belt conveyor 20 feeding an enrober.

As indicated in Fig. 2, the strips 18 of the two tables 17 are moved by a pair of levers 21, 21A connected by a cross bar 22 and individually connected to the associated strips 18 by links 23, the links being connected to the levers at different distances from the fulcrum. As shown in Fig. 2, each strip No. 9 is connected at the maximum distance from the fulcrum and each strip No. 1 at the minimum. In the case under discussion the file of wafer sandwiches on each strip No. 9 moves 4″ more than the file on each strip No. 1. The levers 21 and 21A are duplicated, one lever being provided at each end of each table as shown in more detail in Figs. 12 and 13. The two ends of each table strip 18 are thus constrained to move to equal extents. The tables are kept horizontal by slides, also as explained in more detail later.

The arrangement shown in Fig. 3 is generally similar to that already described apart from the provision between adjoining strips 18 of retractable guides. The guides 24 are raised and lowered by pairs of links 25 pivotally attached at their opposite ends to the guides 24 and to the strips 18. At the right hand side of Fig. 3 the strips 18 are closed up and the guides 24 retracted; on the left hand side the strips 18 are separated and the guides 24 have been raised. Square pieces 26 fitted to the guides 24 serve, in conjunction with the lower corners of the strips 18, to maintain the guides in the vertical position. It is sufficient for the tops of the guides to rise to a level slightly less than half the sandwich thickness above the table surface and for the flights of the overhead conveyor to extend down to about this level.

As already explained, the cut blocks are not transferred directly to the separating tables by the cutter pushers, but through the intermediary of an intervening block. Accordingly when either of the cutter pushers has completed a feed stroke the last rank of sandwiches in the cut block on the associated table is in physical contact with the first rank of sandwiches in the succeeding block which has pushed the preceding block forward. Movement of the table to separate laterally the sandwiches of the preceding block is accordingly liable to disarrange the contacting sandwiches of the two blocks. The mechanism shown in Fig. 4 provides a gap between the two cut blocks prior to movement of the table and consequently avoids this difficulty.

The overhead flight conveyor 19 which transfers the separated sandwiches from the tables includes two driving chains, one at each side of the machine. One of these chains is shown at 27 in Fig. 4. A transversely extending angle section 28 is fixed to a pair of adaptor links 29, one attached to each chain.

Screws 30 passing through the vertical flange of the section 28 hold hollow blocks 31 in place inside the angle and the blocks are drilled to accommodate pivot pins 32. The pins are mounted in shaped lugs on a trailing plate 33 and on the underside of the trailing edge of this plate are fitted rubber pads 34 which contact the tops of the wafer sandwiches when the plate is allowed to pivot in a counter clockwise direction as viewed in Fig. 4. In order to control the contact between the rubber pads and the wafer sandwiches a fixed cam 35 is provided having a low portion 36. This cam co-operates with a roller 37 which is carried by a block 38 welded to the upper side of the trailing edge of the plate 33.

Fig. 4 of the drawings shows a wafer sandwich 2a which is in the first rank of a succeeding cut block pushing towards the table 17 a wafer sandwich 1e which is in the last rank of a preceding cut block and the roller 37 has just entered the low portion 36 of the cam to allow the rubber pads to contact all the wafer sandwiches in rank 1e. The chains 27 and the rubber pads 34 are moving slightly faster than the pusher of the cutting unit and the wafer sandwiches of the preceding cut block are accordingly pulled away from those of the succeeding cut block. The right-hand end of the low portion 36 of the cam is so positioned that the trailing ends of the wafer sandwiches in rank 1e come to rest at position $x$ whereas the leading ends of the wafer sandwiches in rank 2a only advance to the position $y$.

In the construction shown in Figs. 5–8 the strips constituting each wafer separating table are constituted by channel section trays. Alternate trays 18B are disposed at the same horizontal level as the base plate 11 of the cutting unit but the remaining trays 18A are at a common higher level. At the infeed end of the tables is provided a guide system comprising a pair of side members 39 joined by a cross member 40 having a forwardly projecting holding-down tongue 41 disposed above each file of sandwiches proceeding towards the lower trays 18B. Attached to the cross member are a number of channel guides 42 disposed above the sandwiches proceeding towards the higher trays 18A. Beneath each of these channel guides is a fixed ascending ramp 43 for conducting the sandwiches to the level of the higher trays.

As the constituent sandwiches of a cut block are fed towards the table by the pressure of the next following block, alternate files of sandwiches pass up the ramps 43 on to the higher trays 18A while the other files of sandwiches are prevented from rising with them by the holding-down tongues 41 and are fed on to the lower trays 18B. The guide system has a shearing effect on any caramel filling which tends to cause adjacent files of sandwiches to stick together and ensures that the files of sandwiches are effectively separated and prevented from fouling the sides of the trays as they are fed on to the trays.

After the trays have separated, the laterally spaced files of sandwiches are pushed by the overhead flight conveyor (which is described later with reference to Figs. 12 and 13) on to the band conveyor 20 (Fig. 12) which is common to the two tables and at the same level as the base plate of the cutting unit. Descending channel-section ramps 44 opposite the spaced high level trays 18A and shown in cross section in Fig. 7 conduct the sandwiches from the high level trays down to the level of the band conveyor.

Longitudinal separation of the last rank of sandwiches in the stack fed on to the upper trays 18A from the first rank of sandwiches in the succeeding block, is effected automatically by virtue of the leading sandwiches tipping as they pass over the peaks 45 (Fig. 5) of the ramps 43. Longitudinal separation in the case of the sandwiches fed to the lower trays is effected by curved extensions 46 (Fig. 8) affixed to the delivery ends of the ramps 43. As the trays separate, the rear ends of the trailing sandwiches on the lower trays 18B sweep across the extensions 46 which act as cams to push them slightly forward.

As shown in Fig. 5 the trays have projecting tongues 47 engaging guide slots 48 in the machine frame to ensure that the trays remain parallel as they move to and from the separated position.

The construction shown in Figs. 9–11 is generally similar to that just described but differs in regard to the ascending ramps and associated guide system, which are modified so that they provide differently for longitudinal separation of the last rank of sandwiches in each cut block from the first rank of a succeeding cut block. Each ramp 43' is attached to a horizontal platform 49 (Fig. 11) aligned with the associated high level tray 18A. Lower rods 50 control the sandwiches passing to the lower trays and upper rods 51 control the sandwiches passing to the higher trays. Side guides 52 are fixed to and extend for the full length of the ramps 43' and platforms 49 and a curved extension 53 is provided on one of each pair of guides 52. These extensions 53 serve to effect longitudinal separation, as between successive blocks of the sandwiches fed to the higher trays 18A in the same way as the extensions 46 do in the case of the sandwiches fed to the lower trays 18B. In this arrangement the sandwiches experience a straight push as they travel along the platforms 49 to the upper trays 18A.

The mechanism for imparting movement to the trays of the arrangement shown in Figs. 9–11 and also the overhead flight conveyor will now be described in more detail with reference to Figs. 12–14. The trays are linked by links 23, as in Fig. 2, to two pairs of duplicated operating levers 21, 21A joined by cross members 22. As shown most clearly in Fig. 14, movement is imparted to the trays by a cam 54 driven by gearing, not shown, from the mechanism operating the cutter pushers and coacting with a follower 55 on a bell crank 56 pivoted at 57. The bell crank 56 is coupled by an adjusting link 58 to a second bell crank 59, pivoted at 60 and coupled by an adjusting link 61 to one of the cross members 22 and thence by a crankshaft to the other cross member 22.

The chains 27 of the overhead flight conveyor 19 (Figs. 12 and 13), which are driven by a chain drive 62, carry two cross members 63, formed with sets of alternately short and long fingers 64 which cooperate, as clearly shown in Fig. 13, with the sandwiches in the higher and lower trays 18A, 18B to push them down the delivery ramps 44 (Fig. 5) on to the conveyor 20. The fingers on the two cross members act alternately on the two tables when they are respectively in the positions shown at D and E in Fig. 1.

Figs. 15 and 16 show respectively on a larger scale two alternative mechanisms for separating the trays. In the case of Fig. 15 the operating lever 21 is connected by links 23 only to the two extreme trays which are respectively required to have maximum and minimum movement. One such link only is shown in Fig. 15, but it will be understood that another link 23, corresponding to the lowermost link in Fig. 2, connects the lever 21 to the extreme right hand tray, not shown. Compression springs 65 are disposed between adjoining trays and urge them apart, the springs being appropriately matched to give equal spacing of the trays as they move apart as the result of movement of the links 23 to the left to relieve the pressure on the springs. As a still further alternative and as shown in Fig. 16, the trays may be linked together by horizontal lost motion studs 66 extending through flanges 67 depending downwardly from the trays. In this case the lever is connected to the left hand tray only by a single link 23. When this link moves to the right as shown in Fig. 16, the trays close up as shown. On movement of the link 23 to the left, however, the trays are separated in succession, each to a distance from its neighbour determined by the length of the studs 66.

What we claim as our invention and desire to secure by Letters Patent is:

1. In apparatus for the manufacture of wafer sandwiches, the combination with a cutting unit including a base plate and successively operating first and second sets of spaced cutters for respectively cutting wafer sandwich blocks first transversely and then longitudinally into wafer sandwiches, of a wafer-separating table consisting of a number of narrow, longitudinal strips, each of sufficient width to support a single file of wafer sandwiches, means for periodically moving said strips laterally from receiving position, in which they are disposed close together into a spaced position and back again to receiving position, a pusher operating in timed relationship with said moving means when said strips are in the receiving position for feeding transversely cut wafer sandwich blocks in succession along said base plate and through said second set of cutters and onto said table whereby a longitudinally extending file of wafer sandwiches is delivered on to each of the strips of said table, and pusher means operative after said strips have moved to the spaced position to engage the trailing ends of said files of wafer sandwiches and thereby slide them endwise from the table.

2. Apparatus as claimed in claim 1, wherein said pusher means is an overhead flight conveyor situated above the table and carrying cam-controlled means for engaging each cut wafer sandwich block fed on to said table and separating it longitudinally from the following cut wafer sandwich block.

3. Apparatus as claimed in claim 1, wherein alternate strips of the separating table are situated at a lower level than the remaining strips, said alternate strips being vertically staggered relatively to the remaining strips by a distance not less than the thickness of the wafer sandwiches, said apparatus also including a system of guides between the cutter unit and the table for conducting the files of wafer sandwiches to the associated strips of the table.

4. Apparatus as claimed in claim 3, also including fixed members, positioned adjacent the ends of said guides to be encountered by the trailing ends of wafer sandwiches on said alternate strips as they move laterally on separation of the strips, said fixed members constituting cam surfaces effective to push said sandwiches forward as they are moved laterally past said fixed members and thereby establish a gap between them and the sandwiches of a succeeding cut wafer sandwich block.

5. Apparatus as claimed in claim 1, wherein alternate strips of the table are situated at the same level as the base plate of the cutting unit and the remaining strips are disposed at a common higher level, said apparatus also including ascending ramps up which alternate files of wafer sandwiches travel to the higher strips.

6. Apparatus as claimed in claim 5, also including descending ramps at the end of the table remote from said ascending ramps and a common conveyor for receiving wafer sandwiches from all the strips of the table, said pusher means comprising a flight conveyor situated above the table and having long fingers for engaging the wafer sandwiches on the lower strips, and short fingers for engaging the wafer sandwiches on the lower strips and short fingers for engaging the wafer sandwiches on the higher strips.

7. Apparatus as claimed in claim 5, wherein said strips are constituted by channel section trays.

8. Apparatus as claimed in claim 7, also including a horizontal platform aligned with each higher tray and serving to conduct wafer sandwiches thereto from the upper end of the associated ramp, higher guide rods, disposed above said ramps and platforms and extending longitudinally thereof for controlling wafer sandwiches passing to the higher trays, lower guide rods disposed above the path of the wafer sandwiches passing to the lower trays and extending longitudinally thereof, and pairs of side guides, each extending alongside of one of said ramps and platforms.

9. Apparatus as claimed in claim 1, wherein said strips are spaced by narrow gaps when in said receiving position, said apparatus also including retractable guides accommodated in said gaps and means for moving said guides above the level of said strips on movement of said strips into the spaced position.

10. Apparatus as claimed in claim 1, wherein said moving means comprises a pivoted lever, a cam for periodically rocking said lever about its pivot in a plane transverse to said table and links attaching the individual strips of the table to said lever at points spaced at different distances from the pivot of said lever.

11. Apparatus as claimed in claim 1, wherein said moving means comprises a pivoted lever, a cam for periodically rocking said lever about its pivot in a plane transverse to said table, links connecting the outer strips of said table to said lever and compression springs mounted between adjoining strips of said table and urging them apart.

12. Apparatus as claimed in claim 1, wherein said moving means comprises a pivoted lever, a cam for periodically rocking said lever about its pivot in a plane transversal to said table, a link connecting one of the outer strips of said table to said lever and studs extending transversely between adjoining strips of said table, each stud being attached to one of said adjoining strips and engaging with lost motion the other adjoining strip.

13. In a wafer sandwiching machine, the combination, with means for alternately feeding forward along a base plate two spaced parallel columns of cut wafer sandwich blocks, each of said cut blocks including a plurality of files of wafer sandwiches, of a pair of wafer sandwich tables for sepectively receiving cut sandwich blocks from said columns, each of said tables consisting of parallel elongated strips equal in number to the number of files of sandwiches in said blocks, means operative simultaneously on the strips of said tables to move each of them in a lateral direction from a receiving position, in which said strips are close together and in position to receive a cut sandwich block from one of said columns, to a spaced position in which each table is displaced towards the other table and the strips thereof are separated, each of said tables occupying its receiving position when the other table is in its spaced position, a common conveyor for receiving spaced files of wafer sandwiches, from both of said tables in two parallel columns and an overhead flight conveyor common to said tables and operative, when said tables occupy their spaced positions, to transfer spaced files of wafer sandwiches therefrom to said common conveyor.

References Cited in the file of this patent

UNITED STATES PATENTS

| | | |
|---|---|---|
| 2,094,718 | Pentzlin | Oct. 5, 1937 |
| 2,622,545 | Hummel | Dec. 23, 1952 |
| 2,710,696 | Fontaine et al. | June 14, 1955 |